(12) United States Patent
Dotan et al.

(10) Patent No.: US 10,015,153 B1
(45) Date of Patent: Jul. 3, 2018

(54) SECURITY USING VELOCITY METRICS IDENTIFYING AUTHENTICATION PERFORMANCE FOR A SET OF DEVICES

(71) Applicant: EMC Corporation, Hopkinton, MA (US)

(72) Inventors: Yedidya Dotan, Newton, MA (US); Lakshmi Suresh, Westford, MA (US); John Watts, Medford, MA (US); Marcelo Blatt, Modiin (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 185 days.

(21) Appl. No.: 14/138,622

(22) Filed: Dec. 23, 2013

(51) Int. Cl.
    *H04L 29/06* (2006.01)
(52) U.S. Cl.
    CPC .................. *H04L 63/08* (2013.01)
(58) Field of Classification Search
    CPC ........................................ H04L 63/08
    USPC .............................................. 726/3
    See application file for complete search history.

(56) References Cited

U.S. PATENT DOCUMENTS

| | | | | |
|---|---|---|---|---|
| 858,078 | A * | 6/1907 | Knowlton | B26D 3/185 144/162.1 |
| 5,408,607 | A * | 4/1995 | Nishikawa | G05B 19/4185 709/218 |
| 6,192,361 | B1 * | 2/2001 | Huang | H04L 63/083 455/26.1 |
| 6,263,447 | B1 * | 7/2001 | French et al. | 726/5 |
| 6,314,520 | B1 * | 11/2001 | Schell | G06F 21/82 726/13 |
| 6,665,799 | B1 * | 12/2003 | Slama | G06F 21/123 379/93.02 |
| 7,024,556 | B1 * | 4/2006 | Hadjinikitas | H04L 63/0815 709/225 |
| 7,069,000 | B1 * | 6/2006 | Corson | H04L 63/08 455/410 |
| 7,127,524 | B1 * | 10/2006 | Renda | H04L 29/12 709/223 |

(Continued)

OTHER PUBLICATIONS

Merriam-Webster, "rate", 2015.*

(Continued)

*Primary Examiner* — O. C. Vostal
(74) *Attorney, Agent, or Firm* — BainwoodHuang

(57) ABSTRACT

A technique performs authentication. The technique involves performing, by processing circuitry, a set of authentication operations in response to a set of authentication requests, and updating a set of velocity metrics which identifies authentication performance for a set of authentication request sources that originated the set of authentication requests. The technique further involves, after updating the set of velocity metrics, receiving, by the processing circuitry, an authentication request from an authentication request source. The technique further involves providing, by the processing circuitry, an authentication result in response to the authentication request from the authentication request source. The authentication result (i) is based on the set of velocity metrics and (ii) indicates whether the authentication request is considered to be legitimate. Such a technique can detect malicious activity even if a person tries to authenticate just a few times to several accounts in a "touch the fence" style of attack.

15 Claims, 5 Drawing Sheets

(56) References Cited

U.S. PATENT DOCUMENTS

| | | | |
|---|---|---|---|
| 7,139,917 B2* | 11/2006 | Jablon | 713/183 |
| 7,342,906 B1* | 3/2008 | Calhoun | H04L 63/0892 370/310 |
| 7,415,720 B2* | 8/2008 | Jung | G06Q 20/347 713/183 |
| 7,513,428 B2* | 4/2009 | Giordano et al. | 235/455 |
| 7,725,730 B2 | 5/2010 | Juels et al. | |
| 7,739,733 B2 | 6/2010 | Szydlo | |
| 7,865,959 B1* | 1/2011 | Lewis | G06F 21/6218 726/17 |
| 7,908,645 B2* | 3/2011 | Varghese | G06Q 20/341 715/773 |
| 8,225,383 B1* | 7/2012 | Channakeshava | H04L 63/083 726/7 |
| 8,238,532 B1* | 8/2012 | Cox et al. | 379/114.14 |
| 8,353,032 B1* | 1/2013 | Satish | G06F 21/554 726/22 |
| 8,490,162 B1* | 7/2013 | Popoveniuc | G06F 21/316 713/182 |
| 8,499,348 B1* | 7/2013 | Rubin | 726/22 |
| 8,549,595 B1* | 10/2013 | Vaisman | G06F 21/316 713/152 |
| 8,572,366 B1* | 10/2013 | Yadav | H04L 63/08 713/154 |
| 8,613,070 B1* | 12/2013 | Borzycki | G06F 21/6218 726/8 |
| 8,701,174 B1 | 4/2014 | Dotan | |
| 8,726,379 B1* | 5/2014 | Stiansen | H04L 63/1491 726/22 |
| 8,762,724 B2* | 6/2014 | Bravo | G06F 21/31 380/278 |
| 8,819,382 B2* | 8/2014 | Pizlo | G06F 8/443 711/173 |
| 8,875,255 B1* | 10/2014 | Dotan | G06F 21/31 713/182 |
| 8,881,251 B1* | 11/2014 | Hilger | H04L 63/083 713/183 |
| 8,955,076 B1 | 2/2015 | Faibish et al. | |
| 9,077,703 B1* | 7/2015 | Goshen | H04L 63/08 |
| 9,146,669 B2* | 9/2015 | Kim | G06F 3/017 |
| 9,154,496 B2 | 10/2015 | Juels | |
| 9,230,092 B1 | 1/2016 | Juels | |
| 9,529,996 B2* | 12/2016 | Qureshi | G06F 21/53 |
| 9,628,508 B2* | 4/2017 | Turbin | H04L 63/145 |
| 2002/0120722 A1 | 8/2002 | Kutaragi | G11B 20/00086 709/220 |
| 2002/0164023 A1* | 11/2002 | Koelle | G06F 21/552 380/201 |
| 2002/0169843 A1* | 11/2002 | Tsuneda | H04L 63/083 709/206 |
| 2004/0059951 A1* | 3/2004 | Pinkas | G06F 21/34 726/5 |
| 2004/0158639 A1* | 8/2004 | Takusagawa | H04L 29/06 709/229 |
| 2004/0193892 A1* | 9/2004 | Tamura | H04L 63/1458 713/182 |
| 2005/0160280 A1* | 7/2005 | Caslin | G06F 21/55 713/189 |
| 2005/0198099 A1* | 9/2005 | Motsinger | G06F 21/55 709/200 |
| 2005/0228882 A1* | 10/2005 | Watanabe | H04L 67/24 709/224 |
| 2005/0235358 A1* | 10/2005 | Keohane et al. | 726/23 |
| 2005/0243984 A1* | 11/2005 | Mahone | G06F 21/55 379/114.14 |
| 2005/0278542 A1* | 12/2005 | Pierson et al. | 713/182 |
| 2006/0018481 A1* | 1/2006 | Nagano | H04L 9/3271 380/270 |
| 2006/0021031 A1* | 1/2006 | Leahy | C12N 5/0636 726/22 |
| 2006/0037064 A1* | 2/2006 | Jeffries | G06F 21/31 726/4 |
| 2006/0130140 A1* | 6/2006 | Andreev et al. | 726/23 |
| 2006/0154695 A1* | 7/2006 | Ishibashi | H04L 63/0869 455/558 |
| 2006/0224897 A1* | 10/2006 | Kikuchi | H04L 63/18 713/182 |
| 2006/0242414 A1* | 10/2006 | Corson | H04L 63/0807 713/171 |
| 2006/0282660 A1* | 12/2006 | Varghese | G06Q 20/341 713/155 |
| 2007/0067627 A1* | 3/2007 | Dokuni | G06F 21/31 713/168 |
| 2007/0124806 A1* | 5/2007 | Shulman | H04L 63/08 726/5 |
| 2007/0150745 A1* | 6/2007 | Peirce | G06F 21/32 713/186 |
| 2007/0165858 A1* | 7/2007 | Bakshi | H04L 63/068 380/247 |
| 2007/0192843 A1* | 8/2007 | Peterson | H04L 63/0807 726/10 |
| 2007/0234420 A1* | 10/2007 | Novotney | G06F 21/31 726/16 |
| 2007/0280123 A1* | 12/2007 | Atkins et al. | 370/252 |
| 2008/0034411 A1* | 2/2008 | Aoyama | G06F 21/305 726/5 |
| 2008/0108324 A1* | 5/2008 | Moshir | G06F 21/35 455/411 |
| 2008/0244712 A1* | 10/2008 | Kitada | G06F 21/41 726/5 |
| 2008/0285464 A1* | 11/2008 | Katzir | H04L 63/1408 370/241 |
| 2008/0289033 A1* | 11/2008 | Hamilton | G06F 21/445 726/19 |
| 2009/0031406 A1* | 1/2009 | Hirose | H04L 63/1441 726/7 |
| 2009/0041307 A1* | 2/2009 | Iwano et al. | 382/115 |
| 2009/0064281 A1* | 3/2009 | Esaka | H04L 63/08 726/3 |
| 2009/0089252 A1* | 4/2009 | Galitsky | G06F 17/30637 |
| 2009/0111671 A1* | 4/2009 | Campbell et al. | 482/148 |
| 2009/0135731 A1* | 5/2009 | Secades et al. | 370/252 |
| 2009/0172402 A1* | 7/2009 | Tran | G06Q 20/102 713/170 |
| 2009/0172788 A1* | 7/2009 | Vedula | H04L 63/08 726/5 |
| 2009/0187983 A1* | 7/2009 | Zerfos | H04L 63/0823 726/10 |
| 2009/0260078 A1* | 10/2009 | Nakazawa | G06F 21/31 726/19 |
| 2009/0320035 A1* | 12/2009 | Ahlgren | G06F 9/468 718/104 |
| 2010/0017860 A1* | 1/2010 | Ishida | G06F 21/31 726/7 |
| 2010/0284539 A1* | 11/2010 | Roy et al. | 380/278 |
| 2010/0325295 A1* | 12/2010 | Kajiwara | H04L 12/2872 709/229 |
| 2011/0088078 A1* | 4/2011 | Kholaif | H04W 12/06 726/3 |
| 2011/0138445 A1* | 6/2011 | Chasen | G06F 21/10 726/3 |
| 2011/0162066 A1* | 6/2011 | Kim | G06F 3/017 726/18 |
| 2011/0191847 A1* | 8/2011 | Davis | G06F 15/16 726/22 |
| 2011/0202440 A1* | 8/2011 | Jarrah | G06Q 10/1091 705/32 |
| 2011/0246765 A1* | 10/2011 | Schibuk | H04L 63/0428 713/158 |
| 2011/0252479 A1* | 10/2011 | Beresnevichiene | H04L 63/1433 726/25 |
| 2011/0283356 A1* | 11/2011 | Fly | G06F 21/577 726/22 |
| 2011/0296179 A1* | 12/2011 | Templin | G06F 21/606 713/168 |
| 2012/0060030 A1* | 3/2012 | Lamb | 713/166 |
| 2012/0158678 A1* | 6/2012 | McGraw et al. | 707/694 |

(56) References Cited

U.S. PATENT DOCUMENTS

| | | | |
|---|---|---|---|
| 2012/0179802 A1* | 7/2012 | Narasimhan | H04L 41/046 709/223 |
| 2012/0197743 A1* | 8/2012 | Grigg | G06Q 20/20 705/16 |
| 2012/0204245 A1* | 8/2012 | Ting | G06F 21/35 726/6 |
| 2012/0221863 A1* | 8/2012 | Osaka | H04L 9/3271 713/189 |
| 2012/0254935 A1* | 10/2012 | Yato | H04L 9/321 726/1 |
| 2012/0254947 A1* | 10/2012 | Dheap | H04L 63/20 726/4 |
| 2012/0260329 A1* | 10/2012 | Suffling | H04L 63/104 726/9 |
| 2012/0311340 A1* | 12/2012 | Naganuma | G06F 21/35 713/176 |
| 2012/0311611 A1* | 12/2012 | Wang | G06F 9/541 719/318 |
| 2013/0081138 A1* | 3/2013 | Rados et al. | 726/23 |
| 2013/0104201 A1* | 4/2013 | Nandakumar | G06F 21/42 726/5 |
| 2013/0198819 A1* | 8/2013 | Gordon | G06F 21/31 726/5 |
| 2013/0227352 A1* | 8/2013 | Kumarasamy | G06F 11/3072 714/47.1 |
| 2013/0247204 A1* | 9/2013 | Schrecker | H04L 45/306 726/25 |
| 2013/0342314 A1* | 12/2013 | Chen et al. | 340/5.65 |
| 2014/0041005 A1* | 2/2014 | He; Chang | H04L 63/08 726/7 |
| 2014/0047113 A1* | 2/2014 | Subramanya | H04L 69/28 709/225 |
| 2014/0068094 A1* | 3/2014 | Burch | H04L 67/14 709/229 |
| 2014/0068722 A1* | 3/2014 | Hayat | G06Q 20/02 726/4 |
| 2014/0115677 A1* | 4/2014 | Popp | H04L 9/0863 726/6 |
| 2014/0165171 A1* | 6/2014 | Meng | G06F 21/36 726/7 |
| 2014/0165175 A1* | 6/2014 | Sugiyama | G06F 21/45 726/8 |
| 2014/0181968 A1* | 6/2014 | Ge et al. | 726/23 |
| 2014/0189781 A1* | 7/2014 | Manickam | H04L 67/34 726/1 |
| 2014/0237599 A1* | 8/2014 | Gertner et al. | 726/24 |
| 2014/0253376 A1* | 9/2014 | Large | G01S 19/21 342/357.59 |
| 2014/0351596 A1* | 11/2014 | Chan | H04L 63/08 713/170 |
| 2014/0373166 A1* | 12/2014 | Little | G06F 21/79 726/26 |
| 2014/0380475 A1* | 12/2014 | Canning | H04L 63/1408 726/23 |
| 2015/0067779 A1* | 3/2015 | Agawa | G06F 21/31 726/3 |
| 2015/0089621 A1* | 3/2015 | Khalid | H04L 63/08 726/9 |
| 2015/0121496 A1* | 4/2015 | Caldeira De Andrada | H04L 63/08 726/7 |
| 2015/0156183 A1* | 6/2015 | Beyer | H04L 63/08 726/4 |
| 2015/0180894 A1* | 6/2015 | Sadovsky et al. | 726/22 |
| 2015/0269374 A1* | 9/2015 | Fan | G06F 21/31 455/411 |
| 2016/0164893 A1* | 6/2016 | Levi | H04L 63/1416 726/23 |

OTHER PUBLICATIONS

Merriam-Webster, "velocity", 2015.*
Nelson et al., "Common Remote Authentication Dial in User Service (RADIUS) Implementation Issues and Suggested Fixes", RFC 5080, 2007.*
Rigney et al., "Remote Authentication Dial in User Servics (RADIUS)", RFC 2865, 2000.*
Sandhya, "Secure Initial Access Authentication in WLAN", 2014.*
Fonseca et al., "Experiences with Tracing Causality in Network Services", 2010.*
Bari et al., "An AAA based service customization framework for Public WLANs", 2005.*
Merriam-Webster, "velocity", 2016.*
Dai Zovi, "Apple iOS 4 Security Evaluation", 2011.*
Hoog et al., "iPhone and iOS Forensics", "Investigation, Analysis and Mobile Security for Applie iPhone, iPad and iOS Devices", select pages, 2011.*
Seriot, "iPhone Privacy", 2010.*
Smith, "iPhone Applications & Privacy Issues: An Analysis of Application Transmission of iPhone Unique Device Identifiers (UDIDs)", 2010.*

* cited by examiner

| | 110 | 112 | 114 | 116 |
|---|---|---|---|---|
| 104(1) | Device Identifer 110(1) | Velocity Metrics 112(1) | Additional Device Identification Data 114(1) | Additional Device History Data 116(1) |
| 104(2) | Device Identifer 110(2) | Velocity Metrics 112(2) | Additional Device Identification Data 114(2) | Additional Device History Data 116(2) |
| 104(3) | Device Identifer 110(3) | Velocity Metrics 112(3) | Additional Device Identification Data 114(3) | Additional Device History Data 116(3) |
| | ... | ... | ... | ... |

FIG. 4

SECURITY USING VELOCITY METRICS IDENTIFYING AUTHENTICATION PERFORMANCE FOR A SET OF DEVICES

BACKGROUND

A conventional remote server may require the owner of an account to authenticate before granting login access to the owner. Along these lines, the owner may need to supply a username and password which the remote server compares to an expected username and password. If there is a correct match, the remote server grants the owner with login access to the account. However, if there is not a match, the remote server denies login access to the account.

During such operation, the remote server may lockout (or deny login access to) the account until a system manager resets the account or for a set length of time if a certain number of unsuccessful login attempts are made. For example, suppose that a malicious person attempts to successfully login to the account by trying different passwords hoping to guess correctly. If the limit to the number of failed login attempts is reached during some amount of time (e.g., three failed login attempts within a two minute period), the remote server locks out the malicious person by preventing further login attempts to that account.

SUMMARY

Unfortunately, there are deficiencies to the above-described conventional approach to locking out accounts in response to unsuccessful login attempts. For example, an attacker may try to avoid detection by trying to login just a few times to several accounts of the remote server. In this situation, the attacker may have the usernames of several account holders, and hope to correctly guess the password to one of their accounts. If the attacker does not exceed the lockout limit (i.e., the threshold of failed login attempts that must be exceeded before the remote server lockouts an account), the attacker's malicious activity which can be referred to as a "touch the fence" style of attack will go undetected.

In contrast to the above-described conventional approach to locking out an account on a remote server when the limit to the number of failed login attempts is reached during some amount of time, improved techniques are directed to authentication which involves velocity metrics identifying authentication performance for a set of authentication request sources (e.g., computerized devices, IP addresses, etc.). An example of such a velocity metric is the number of failed authentication attempts during a particular amount of time from a particular source device. If a malicious person attempts to authenticate using different usernames and passwords, there will be an increase in the number of failed authentication attempts (or an increase in the failure rate) from that source device. Accordingly, the malicious person's activity is detectable even if the malicious person tries to login just a few times to several accounts in a "touch the fence" style of attack. Suitable actions in response to such detection include locking out the particular source device, locking out further authentication attempts across the entire system, placing the source device on a blacklist or similar notification to devices of a fraud mitigation network, and so on.

One embodiment is directed to a method of performing authentication. The method includes performing a set of authentication operations in response to a set of authentication requests, and updating a set of velocity metrics which identifies authentication performance for a set of authentication request sources that originated the set of authentication requests. The method further includes, after updating the set of velocity metrics, receiving an authentication request from an authentication request source, and providing an authentication result in response to the authentication request from the authentication request source. The authentication result (i) is based on the set of velocity metrics and (ii) indicates whether the authentication request is considered to be legitimate.

In some arrangements, the set of velocity metrics includes a set of failed authentication velocities. In these arrangements, updating the set of velocity metrics includes updating the set of failed authentication velocities based on failed authentication operations of the set of authentication operations.

In some arrangements, updating the set of failed authentication velocities includes updating, for each source of the set of the authentication request sources, a respective failed authentication velocity. It should be understood that riskiness of that source increases as the respective failed authentication velocity for that source increases.

In some arrangements, updating the set of failed authentication velocities includes deriving, for each source of the set of the authentication request sources, a respective rate of change in respective failed authentication velocity. Riskiness of that source increases as the respective rate of change in respective failed authentication velocity for that source increases.

In some arrangements, the method further includes performing an authentication-related action based on the set of failed authentication velocities. A variety of such actions can be performed individually or in combination.

In some arrangements, the set of failed authentication velocities indicates an abnormally high failed authentication velocity for a particular authentication request source. In these arrangements, performing the authentication-related action based on the set of failed authentication velocities includes, in response to detection of the abnormally high failed authentication velocity for the particular authentication request source, (i) locking out the particular authentication request source, (ii) distributing a list of suspicious authentication request sources to a set of server devices of a fraud mitigation network, the list of suspicious authentication request sources identifying the particular authentication request source, and (iii) transitioning the processing circuitry from operating in a "not locked out" state in which further authentication requests are processed to a "locked out" state in which further authentication requests are denied.

In some arrangements, the method is performed in an authentication server. In these arrangements, the method may further include maintaining, as an overall server sensitivity index, a measure of riskiness indicating whether the authentication server is currently under attack from an attacker.

In some arrangements, the method further includes comparing the overall server sensitivity index to a predefined threshold. In these arrangements, the method further includes maintaining the authentication server in a "not locked out" state in which the authentication server performs further authentication operations in response to further authentication requests while the overall server sensitivity index is below the predefined threshold. Additionally, the method further includes operating the authentication server in a "locked out" state in which the authentication server denies further authentication requests while the overall server sensitivity index is above the predefined threshold.

In some arrangements, the authentication server is currently operating in the "locked out" state. In the arrangements, the method further includes, after the authentication server operates in the "locked out" state due to the overall server sensitivity index being above the predefined threshold, maintaining the authentication server in the "locked out" state until a human administrator resets the authentication server to the "not locked out" state.

In alternative arrangements, the authentication server is currently operating in the "locked out" state. In these arrangements, the method further includes, after the authentication server operates in the "locked out" state due to the overall server sensitivity index being above the predefined threshold, maintaining the authentication server in the "locked out" state for a predefined period of time and automatically transitioning the authentication server from the "locked out" state back to the "not locked out" state after expiration of the predefined period of time.

It should be understood that, in the cloud context, at least some of the electronic circuitry is formed by remote computer resources distributed over a network. Such a computing environment is capable of providing certain advantages such as enhanced fault tolerance, load balancing, processing flexibility, etc.

Other embodiments are directed to electronic systems and apparatus, processing circuits, computer program products, and so on. Some embodiments are directed to various methods, electronic components and circuitry which are involved in security and authentication using velocity metrics which identify authentication performance for a set of devices.

BRIEF DESCRIPTION OF THE DRAWINGS

The foregoing and other objects, features and advantages will be apparent from the following description of particular embodiments of the present disclosure, as illustrated in the accompanying drawings in which like reference characters refer to the same parts throughout the different views. The drawings are not necessarily to scale, emphasis instead being placed upon illustrating the principles of various embodiments of the present disclosure.

FIG. 4 is a block diagram of example of some velocity metrics which are maintained by the authentication server of FIG. 2.

DETAILED DESCRIPTION

An improved technique is directed to providing security which involves velocity metrics identifying authentication performance for a set of authentication request sources (e.g., computerized devices, IP addresses, etc.). An example of such a velocity metric is the number of failed authentications during an amount of time from a particular source device (i.e., an authentication failure rate for that source device). If an attacker attempts to authenticate using different usernames and passwords, there will be an increase in the number of failed authentications (or an increase in the authentication failure rate) for that source. Accordingly, the attacker's activity is detectable even if the attacker tries to login just a few times to several accounts in a "touch the fence" style of attack. Suitable security actions in response to such detection include locking out the particular source device, locking out further authentication attempts across the entire system, placing the source device on a blacklist or other notification to participants of a fraud mitigation network, and so on.

Figure 1:
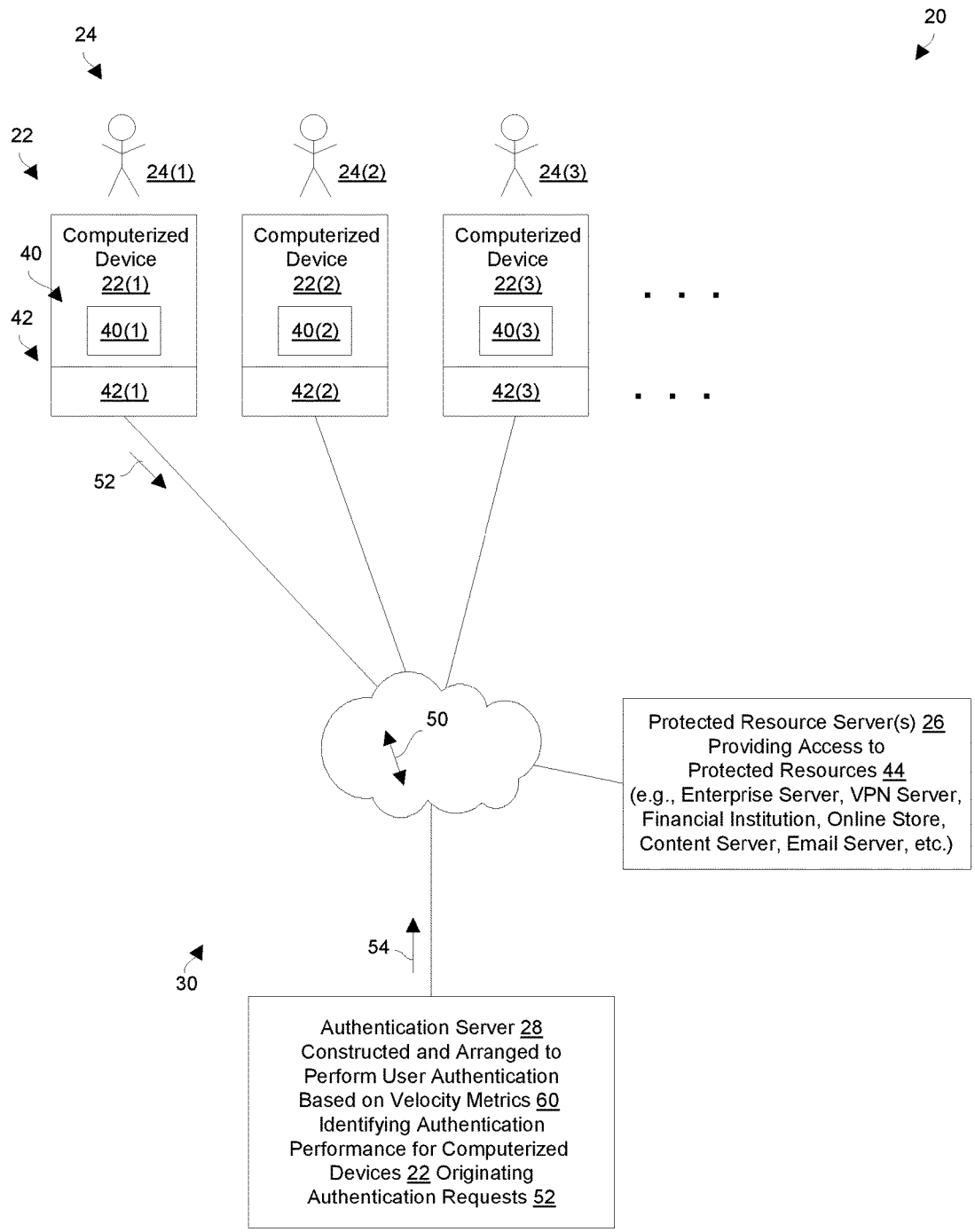
FIG. 1 is a block diagram of an electronic environment which provides security using velocity metrics identifying authentication performance for a set of devices.

FIG. 1 shows an electronic environment 20 which is suitable for imposing security using velocity metrics identifying authentication performance for a set of devices. The electronic environment 20 includes computerized devices 22(1), 22(2), 22(3), . . . (collectively, computerized devices 22) controlled by respective users 24(1), 24(2), 24(3), . . . (collectively, users 24), a set of protected resource servers 26 (i.e., one or more protected resource servers 26), an authentication server 28, and a communications medium 30.

Each computerized device 22 includes a set of device identifiers 40 which enable other components of the electronic environment 20 to properly identify that computerized device 22. Suitable device identifiers 40 include computerized cookies, device addresses (e.g., MAC addresses, IP addresses, etc.), characteristics of various software (e.g., browser type, version numbers, installed features/languages/add-ons, user agent strings, etc.), serial numbers of circuits/modules/peripherals/software/etc., combinations thereof, and so on. Such device identifiers 40 can be conveyed directly to the other components and/or are discernable indirectly based on the behavior of and communications with the computerized devices 22.

It should be understood that the computerized devices 22 may connect to the communications medium 30 through respective local network equipment 42. For example, computerized device 22(1) connects to the communications medium 30 through network equipment 42(1), computerized device 22(2) connects to the communications medium 30 through network equipment 42(2), computerized device 22(3) connects to the communications medium 30 through network equipment 42(3), and so on. Such network equipment 42 may have their own identifying attributes which can be further used to identify the computerized devices 22 such as IP addresses, serial numbers, specialized protocols, etc. Moreover, due to participation of the network equipment 42 in communications (e.g., ISP information, packet headers and routing information, encapsulation, re-formatting, etc.), the identifying attributes of the network equipment 42 may enable further identification of the computerized devices 22 from the perspective of the other components of the electronic environment 20.

The set of protected resource servers 26 maintains protected resources 44 which can be accessed remotely by the computerized devices 22 after successful authentication. Examples of suitable protected resources 44 include (among others) accounts and databases of enterprises, VPNs/gateways/other networks, account access and transaction access with banks/brokerages/other financial institutions, transaction performance at online stores, databases containing movies/music/files/other content, access to email, access to online games, and so on.

The authentication server 28 performs authentication to control access to the protected resources 44 (e.g., by communicating with the set of protected resource servers 26, by communicating directly with the computerized devices 22, etc.). Along these lines, authentication results from the authentication server 28 can be based on (i) a set of authentication factors provided in authentication requests, (ii) user authentication profiles which profile the users 24, and (iii) other information which exists at the time of receiving the authentication requests such as the earlier-mentioned velocity metrics, device lockout states, user lockout states, system conditions, and so on.

The communications medium 30 is constructed and arranged to connect the various components of the electronic environment 20 together to enable these components to exchange electronic signals 50 (e.g., see the double arrow 50). At least a portion of the communications medium 30 is illustrated as a cloud to indicate that the communications medium 30 is capable of having a variety of different topologies including backbone, hub-and-spoke, loop, irregular, combinations thereof, and so on. Along these lines, the communications medium 30 may include copper-based data communications devices and cabling, fiber optic devices and cabling, wireless devices, combinations thereof, etc. Furthermore, the communications medium 30 is capable of supporting LAN-based communications, SAN-based communications, cellular communications, combinations thereof, etc.

During operation, the users 24 operate their respective computerized devices 22 to perform useful work. Such work may include accessing one or more protected resources 44 of the protected resource servers 26 (e.g., accessing a VPN, reading email, performing a banking transaction, making an online purchase, downloading and installing an application from a remote server, saving content in the cloud, and so on).

During the course of such operation, the authentication server 28 controls access to the protected resources 44. That is, the users 24 of the computerized devices 22 provide authentication requests 52, and the authentication server 28 provides authentication results (or responses) 54 to the authentication requests 52 indicating whether authentication is successful. Such authentication requests 52 may be conveyed through the protected resource servers 26 (i.e., the protected resources servers 26 may operate as authentication front-ends, and the authentication server 28 operates in the background in a manner which is transparent from the perspective of the computerized devices 22).

When the users 24 successfully authenticate, the authentication server 24 grants access to the protected resources 44 (e.g., the authentication server 24 signals the protected resource servers 26 that the users 24 are deemed to be authentic and thus are entitled to access the protected resources 44). However, when the users 24 do not properly authenticate, the authentication server 24 denies access to the protected resources 44 (e.g., the authentication server 24 signals the protected resource servers 26 that the users 24 are to be denied access due to unsuccessful authentication).

During such operation, the authentication server 28 maintains a set of velocity metrics 60 which identifies authentication performance for each computerized device 22 originating authentication requests 52. In particular, the authentication server 28 maintains, for each computerized device 22, a set of failed authentication velocities based on failed authentication attempts. An increase in the number of failed authentication attempts during a particular amount of time from a particular computerized device 22 (i.e., an increase in failed authentication velocity) indicates a strong likelihood of an attack from that computerized device 22.

It should be understood that the failed authentication velocity for a computerized device 22 increases with every failed authentication attempt from that device 22. Accordingly, a malicious person trying unsuccessfully to access the same account with different passwords will increase this velocity metric. Additionally, a malicious person trying unsuccessfully to access different accounts with a few authentication attempts trying not to be detected (i.e., a "touch the fence" attack) will increase this velocity metric. Even a malicious person trying unsuccessfully to guess usernames or user IDs will increase this velocity metric.

In response to such detection, the authentication server 28 performs a remedial operation. Examples of such operations include locking out the computerized device 22 which is the source of the failed authentication attempts, adding the computerized device 22 to security data which is shared among a fraud mitigation syndicate, increasing an overall server sensitivity index (i.e., a measure of riskiness indicating whether the authentication server 28 is currently under attack from an attacker) which can be used to control authentication operation globally, and so on. Further details will now be provided with reference to FIG. 2.

Figure 2:
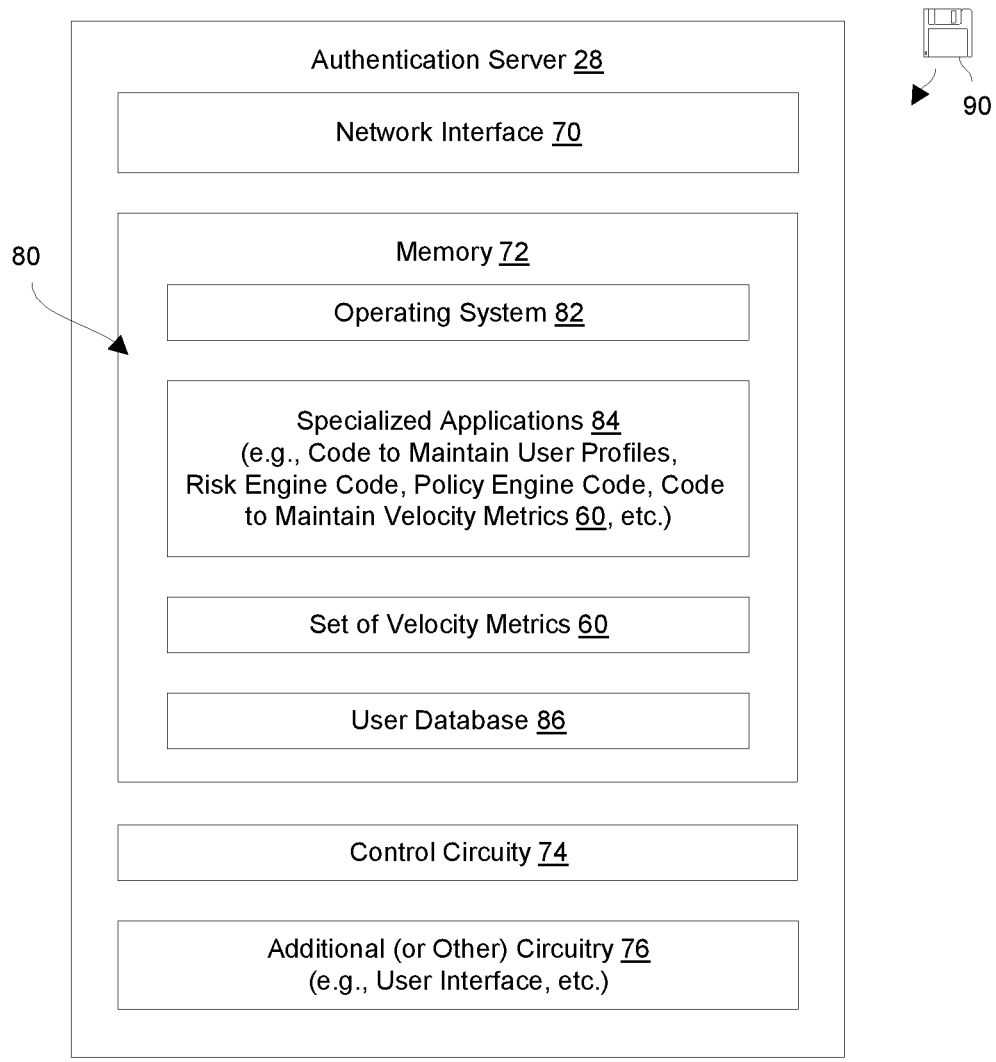
FIG. 2 is a block diagram of an authentication server of the electronic environment of FIG. 1.

FIG. 2 shows particular details of the authentication server 28 of the electronic environment 20. The authentication server 28 includes a network interface 70, memory 72, control circuitry 74, and additional (or other) circuitry 76.

The network interface 70 is constructed and arranged to connect the authentication server 28 to the communications medium 30. Accordingly, the network interface 70 enables the authentication server 28 to communicate with the other components of the electronic environment 20 (FIG. 1). Such communications may be copper-based, fiber-optic-based, or wireless (i.e., IP-based, SAN-based, cellular, Bluetooth, combinations thereof, and so on).

The memory 72 is intended to represent both volatile storage (e.g., DRAM, SRAM, etc.) and non-volatile storage (e.g., flash memory, magnetic disk drives, etc.). The memory 72 stores a variety of software constructs 80 including an operating system 82 to manage the computerized resources of the authentication server 28, specialized applications 84 to form authentication operations (e.g., code to form a risk-engine, code to form a policy engine, code to maintain the set of velocity metrics 60, and so on), the set of velocity metrics 60, and a user database 86 to hold user information. Such user information can include user details (e.g., a user identifier, a username, contact data, etc.), user privileges (e.g., account information, a list of protected resources 44 which the user 24 owns, etc.), user PINs (or PIN hashes), user secrets/seeds for OTP derivation, user activity history, and so on.

The control circuitry 74 is constructed and arranged to operate in accordance with the various software constructs 80 stored in the memory 72. Such circuitry may be implemented in a variety of ways including via one or more processors (or cores) running specialized software, application specific ICs (ASICs), field programmable gate arrays (FPGAs) and associated programs, discrete components, analog circuits, other hardware circuitry, combinations thereof, and so on. In the context of one or more processors executing software, a computer program product 90 is capable of delivering all or portions of the software to the authentication server 28. The computer program product 90 has a non-transitory (or non-volatile) computer readable medium which stores a set of instructions which controls one or more operations of the authentication server 28. Examples of suitable computer readable storage media include tangible articles of manufacture and apparatus which store instructions in a non-volatile manner such as CD-ROM, flash memory, disk memory, tape memory, and the like.

The additional (or other) circuitry 76 is optional and represents additional hardware that can be utilized by the authentication server 28. For example, the authentication server 28 can include a user interface (i.e., a console or terminal) enabling a human administrator to set up new users 24, to deal with alarms or warning messages, to administer routine maintenance, to reset operation of the authentication server 28, and so on. As another example, a portion of the authentication server 28 may operate as a source for distributing computerized device code during configuration/enrollment (e.g., an app store, a central app repository, etc.). Other components and circuitry are suitable for use as well.

During operation, the authentication server 28 runs in accordance with the specialized applications 84 to reliably and robustly control access to the protected resources 44 of the protected resource servers 26. In particular, the authentication server 28 enrolls users 24 and stores the enrollment data in the user database 86. For example, the authentication server 28 can store, maintain and update user profiles on behalf of the users 24 of the computerized devices 22. Once the users 24 are properly enrolled, the authentication server 28 responds to authentication requests 52 from the users 24 with authentication results 54 which either grant or deny access to the protected resources 44 (also see FIG. 1).

In some arrangements, the authentication server 28 performs standard multi-factor authentication (i.e., compares current authentication factors such as user identifiers, personal identification numbers or PINs, passwords, etc. to expected authentication factors). In other arrangements, the authentication server 28 performs risk-based or adaptive authentication (AA) in which a numerical risk score is generated indicating a measure of riskiness that the authentication source is fraudulent. Other types of authentication are suitable for use as well such as knowledge based authentication, biometric authentication, combinations of different forms of authentication, and so on.

While the authentication server 28 performs authentication operations, the authentication server 28 maintains a set of velocity metrics 60 for each computerized device 22, and authentication performance for each computerized device 22 serves as an indicator of whether that computerized device 22 is a source of a malicious attack (e.g., login attempts by a fraudster). As mentioned earlier, the authentication server 28 is able to accurately identify each computerized device 22 based on express device identifiers (e.g., cookies, IP addresses, etc.), indirect device identifiers (e.g., browser features, user agent strings, ISP data, etc.), combinations thereof, etc.

For example, for a particular computerized device 22, when the number of failed authentication attempts during a period of time or the velocity metric increases by a predetermined threshold amount, the authentication server 28 considers that computerized device 22 to be used by an attacker. In response, the authentication server 28 performs a remedial action such as locking out that computerized device 22, sending an alarm to a human administrator, notifying a fraud mitigation network, and so on.

In some arrangements, the authentication server 28 maintains as part of the set of velocity metrics 60, an overall server sensitivity index. This index is a measure of riskiness indicating whether the authentication server 28 from an overall perspective is currently under attack from an attacker. Along these lines, suppose that an attacker tries to overcome security by authenticating from different computerized devices 22 (i.e., somehow changing the device identifiers 40 and/or the identifiers of the network equipment 42).

The overall server sensitivity index can serve as a measure of overall security health (e.g., increased in response to detected security weakness, lowered in response to detected security strength, etc.). Accordingly, the authentication server 28 updates the overall server sensitivity index based on current failed authentication velocities, among other things (e.g., an increase in the number of user lockouts, abnormal traffic patterns, high levels of traffic from blacklisted devices, etc.).

Furthermore, when the overall server sensitivity index remains below a particular predefined index threshold, the authentication server 28 operates in a normal mode by processing authentication requests 52 and providing authentication results 54. However, when the overall server sensitivity index exceeds the particular predefined index threshold, the authentication server 28 transitions from the normal mode to a high security mode by no longer granting access to protected resources 44 in response to authentication requests 52, i.e., a global lockout.

The global lockout can apply to groups of computerized devices 22, groups of protected resources 44, classes of communications, all protected resources 44, and so on. In some arrangements, the global lockout remains in effect until a human administrator resets the authentication server 28 (e.g., allowing time to evaluate/analyze the attack, impose additional safety measures, etc.). In other arrangements, the global lockout remains in effect for a predefined period of time (e.g., an hour, a day, etc.), and the authentication server 28 automatically transitions from the high security mode back to the normal mode once the period of time expires.

Additionally, the overall server sensitivity index can be used as an authentication factor in various forms of authentication such as risk-based authentication. Accordingly, each authentication operation performed in response to an individual authentication request 52 takes the overall security health of the authentication server 28 into account. Further details will now be provided with reference to FIGS. 3 and 4.

Figure 3:
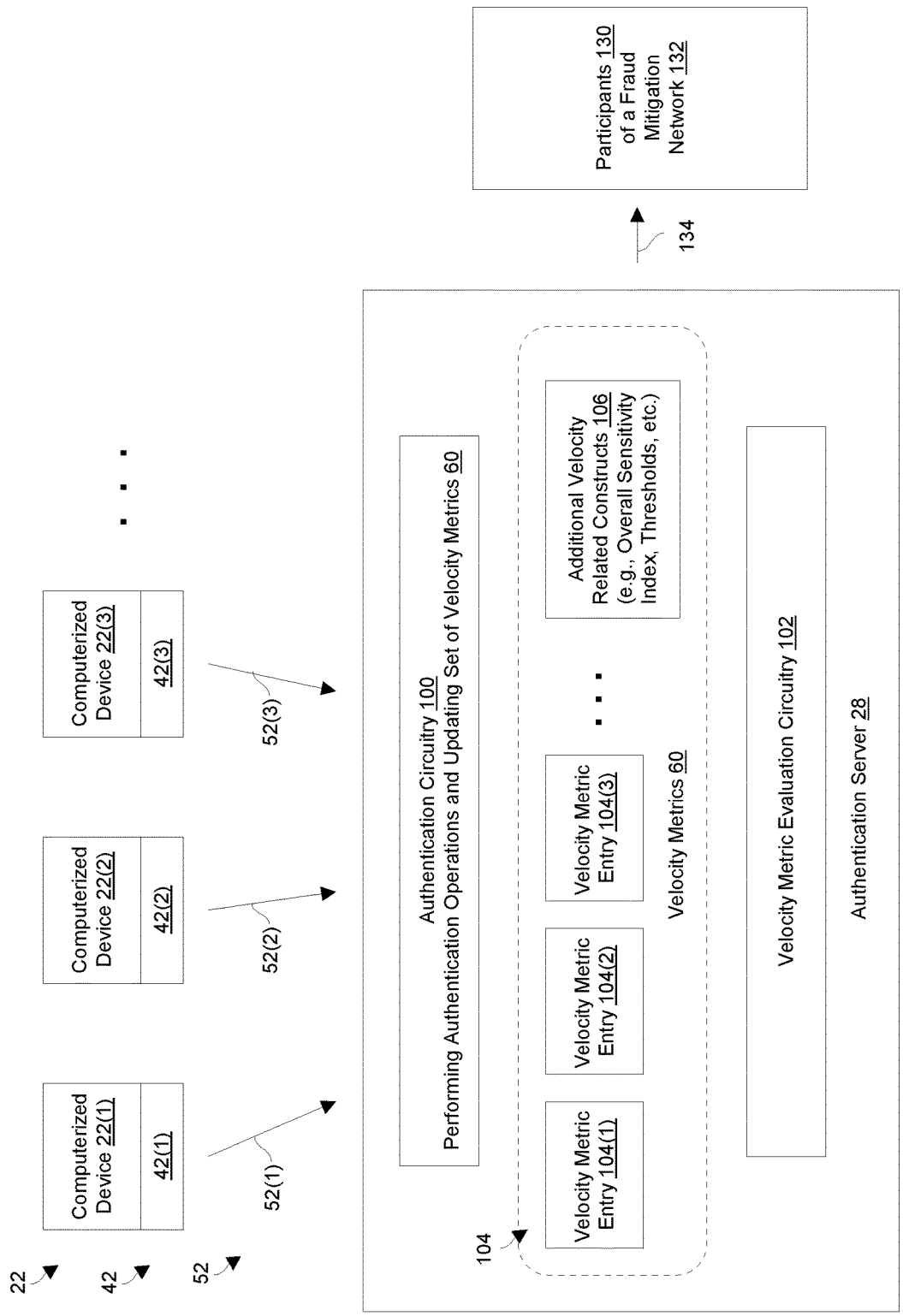
FIG. 3 is a block diagram which illustrates certain operational details of the authentication server of FIG. 2.

FIGS. 3 and 4 show particular details of the authentication server 28. FIG. 3 illustrates certain operational details of the authentication server 28. FIG. 4 shows, by way of example, certain velocity metrics 60 which can be maintained by the authentication server 28.

As shown in FIG. 3, the authentication server 28 includes authentication circuitry 100 and velocity metric evaluation circuitry 102. Such circuitry can be formed when the control circuitry 74 of the authentication server 28 executes particular code such as the specialized applications 84 (also see FIG. 2).

The authentication circuitry 100 receives and processes authentication requests 52 from the computerized devices 22 (also see FIG. 1). In particular, in response to each authentication request 52, the authentication circuitry 100 provides a respective authentication result 54 (FIG. 1). The authentication result 54 indicates whether authentication is considered successful or unsuccessful. It should be understood that, when the authentication requests 52 are provided through the protected resource servers 26 (i.e., when the protected resource servers 26 operate as authentication front-end devices), the authentication results 54 can be provided back to the protected resource servers 26 to enable effective access control over the protected resources 44 (FIG. 1). Alternatively, the authentication result 54 can be provided directly back to the computerized devices 22 (e.g., certificates, SAML tokens, and the like).

Additionally, in response to each authentication request 52, the authentication circuitry 100 updates the set of velocity metrics 60. In particular, the authentication server 28 is constructed and arranged to maintain a respective velocity metric entry 104 for each computerized device 22. If the authentication circuitry 100 encounters an authentication request 52 from an unknown computerized device 22 (e.g., as identified uniquely by device identifiers 40 and/or associated network equipment 42), the authentication circuitry 100 creates a new set of entries 104 in the set of velocity metrics 60 in order to track authentication performance for that computerized device 22. However, if the authentication circuitry 100 encounters an authentication request 52 from a known computerized device 22, the authentication circuitry 100 updates the appropriate entries 104 in the set of velocity metrics 60 in order to track authentication performance for that computerized device 22. Moreover, such an entry 104 can be removed after a long period of inactivity.

By way of example and as shown in FIG. 3, the authentication circuitry 100 maintains a velocity metric entry 104(1) in response to authentication requests 52(1) from the computerized device 22(1). Likewise, the authentication circuitry 100 maintains a velocity metric entry 104(2) in response to authentication requests 52(2) from the computerized device 22(2), a velocity metric entry 104(3) in response to authentication requests 52(3) from the computerized device 22(3), and so on.

Also shown in FIG. 3 are additional velocity related constructs 106. Such constructs 106 include the earlier-mentioned overall sensitivity index, various thresholds, and so on.

FIG. 4 shows particular details of the velocity metric entries 104. In particular, each velocity metric entry 104 includes, among other things, a device identifier 110 to uniquely identify the computerized device 22, velocity metrics 112 regarding that computerized device 22, additional device identification data 114, and additional device history data 116. The entries 104 can include other information as well.

Each device identifier 110(1), 110(2), 110(3), . . . uniquely identifies a respective computerized device 22(1), 22(2), 22(3), . . . . Such an identifier 110 can be assigned by the authentication server 28 upon detection of a new computerized device 22.

Each velocity metric 112(1), 112(2), 112(3), . . . provides a measure authentication performance of the respective computerized device 22(1), 22(2), 22(3), . . . . A suitable velocity metric 112 is a current authentication failure rate (e.g., the number of failed authentication attempts within a period of time (e.g., 30 seconds, one minute, two minutes, five minutes, etc.) In some arrangements, the authentication server 28 maintains multiple velocity metrics 112 for each computerized device 22 in order to distinguish between a series of manual user authentication attempts and a series of automated authentication attempts (e.g., by software).

The additional device identified data 114(1), 114(2), 114(3), . . . is a collection of information which can serve multiple purposes. For example, in real time, such data 114 can serve as a source of one or more authentication factors, or input to calculate other velocity metrics. Furthermore, such data 114 can be made available later for fraud investigation and circulated among participants 130 of a fraud mitigation network 132 (see arrow 134 in FIG. 3). Along these lines, such data 114 can identify attack patterns, which device configurations are used in fraud, which ISPs/geo-locations/IP addresses are used in fraud, and so on.

The additional device history data 116(1), 116(2), 116(3), . . . is another collection of information which can serve multiple purposes. For example, such data 116 can identify attack frequency, common attack times, common attack levels, etc. Such data 114 can serve as a source of one or more authentication factors, or as input to calculate other velocity metrics. Additionally, such data 114 can be made available later for fraud investigation and circulated among participants 130 of a fraud mitigation network 132 (again, see arrow 134 in FIG. 3).

It should be understood that while such authentication-related operations takes place, the velocity metric evaluation circuitry 102 monitors the velocity metric entries 104 to determine whether the authentication server 28 is being attacked. In particular, a velocity metric 104 indicating an unusual rise in failed authentication attempts over a set period of time may indicate the presence of an attacker. For example, a sharp increase in the authentication failure rate for a computerized device 22 is a sign that a malicious person is operating that computerized device 22. Example abnormal increases include increases over a predefined amount of time of 5%, 10%, 15%, and so on. Since authentication performance is maintained per computerized device 22 rather than per user 24 such detection occurs even if the attacker attempts to authenticate just a few times from the same computerized device 22 across multiple users 24.

Moreover, the velocity metric evaluation circuitry 102 updates the overall sensitivity index that serves as a measure of riskiness (or threat level) for the entire authentication server 28. In particular, the velocity metric evaluation circuitry 102 increases the overall sensitivity index if it senses a sudden increase in the authentication failure rate for a computerized device 22 or if it locks out a computerized device 22. The velocity metric evaluation circuitry 102 can lower the overall sensitivity index over time in response to the lack of threats such as a subsequent period of low authentication failure rates.

If the overall sensitivity index exceeds a predefined threshold, the velocity metric evaluation circuitry 102 can be configured to lockout one or more computerized devices 22 to safeguard the protected resources 44. Additionally, the velocity metric evaluation circuitry 102 can control when the authentication server 28 is re-enabled to perform authentication operations to grant access to the protected resources 44 (e.g., after being manually reset by a human administrator, automatically after a period of time has elapsed, etc.).

It should be understood that the velocity metrics 104 and the overall sensitivity index can be used as authentication factors in future authentication operations. Along these lines, these metrics are well suited for risk-based authentication which uses weights and scores to generate an overall risk score indicating an amount of riskiness of fraud. For example, for any authentication requests 52 from a particular computerized device 22, the authentication server 28 can take into account the current authentication failure rate for that computerized device 22. Similarly, for any authentication requests 52, the authentication server 28 can take into account the current overall sensitivity index. Further details will now be provided with reference to FIG. 5.

Figure 5:
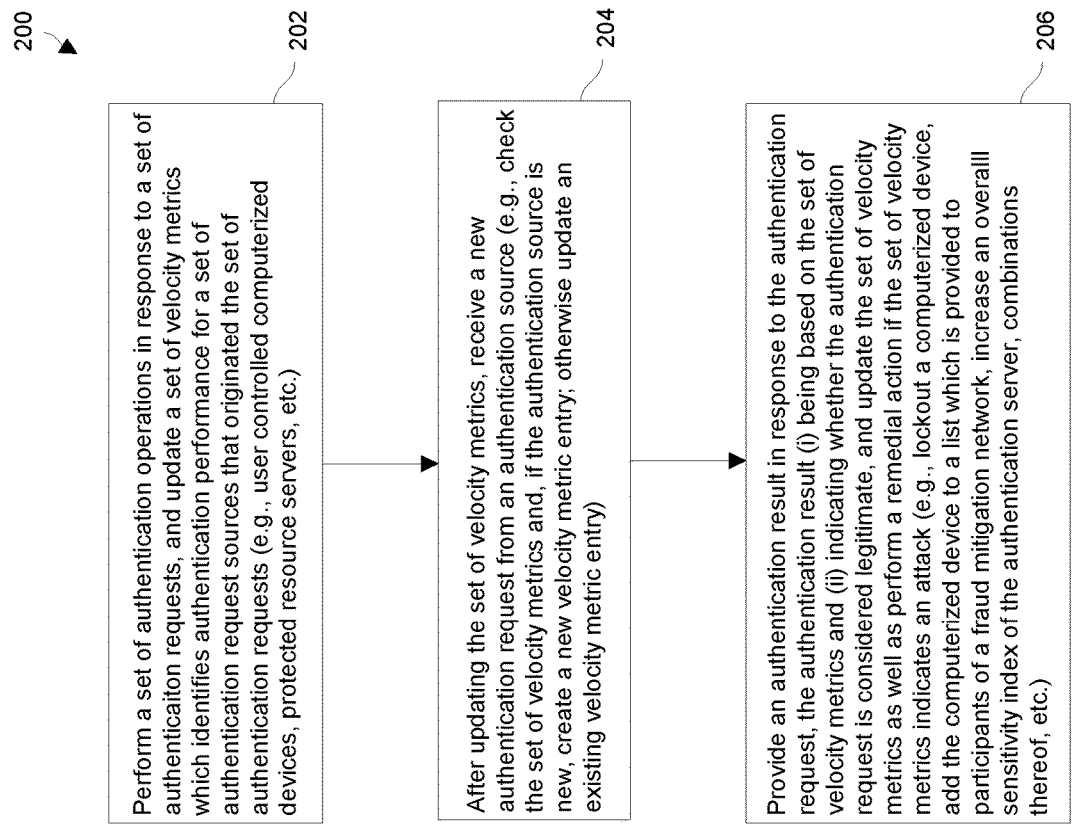
FIG. 5 is a flowchart of a procedure which is performed to provide security using velocity metrics identifying authentication performance for a set of devices.

FIG. 5 is a flowchart of a procedure 200 which is performed by the authentication server 28 to provide security using velocity metrics identifying authentication performance for the set of computerized devices 22. At 202, the authentication server 28 performs a set of authentication operations in response to a set of authentication requests 52, and updates a set of velocity metrics 60 which identifies authentication performance for a set of authentication request sources that originated the set of authentication requests 52. Example sources include user devices, resource servers, and so on.

At 204, the authentication server 28, after updating the set of velocity metrics, receives a new authentication request 52 from an authentication request source. As mentioned above, if the authentication request source is new to the authentication server 28, the authentication server 28 creates a new entry 104 (see FIG. 4). Otherwise, the authentication server 28 updates an existing entry 104.

At 206, the authentication server 28 provides an authentication result 54 in response to the authentication request 52 from the authentication request source. The authentication result 54 (i) is based on the set of velocity metrics 60 and (ii) indicates whether the authentication request 52 is considered to be legitimate. Additionally, the authentication server 28 updates the set of velocity metrics 60 as well as performs a remedial action if the set of velocity metrics 60 indicates an attack.

As described above, improved techniques are directed to providing security using velocity metrics 60 identifying authentication performance for a set of authentication request sources (e.g., computerized devices, IP addresses, etc.). An example of such a velocity metric 60 is the number of failed authentication attempts during a particular amount of time from a particular computerized device 22. If a malicious person attempts to authenticate using different usernames and passwords, there will be an increase in the number of failed authentication attempts (or an increase in the failure rate) from that computerized device 22. Accordingly, the malicious person's activity is detectable even if the malicious person tries to login just a few times to several accounts in a "touch the fence" style of attack, tries unsuccessfully to guess usernames, etc. Suitable actions in response to such detection include locking out the particular computerized device 22, locking out further authentication attempts across the entire authentication server 28 and/or protected resource servers 26, placing the computerized device 22 on a blacklist or similar notification to members of a fraud mitigation network, and so on.

While various embodiments of the present disclosure have been particularly shown and described, it will be understood by those skilled in the art that various changes in form and details may be made therein without departing from the spirit and scope of the present disclosure as defined by the appended claims.

For example, it should be understood that various components such as the servers 26, 28 of the electronic environment 20 are capable of being implemented in or "moved to" the cloud, i.e., to remote computer resources distributed over a network. Here, the various computer resources may be distributed tightly (e.g., a server farm in a single facility) or over relatively large distances (e.g., over a campus, in different cities, coast to coast, etc.). In these situations, the network connecting the resources is capable of having a variety of different topologies including backbone, hub-and-spoke, loop, irregular, combinations thereof, and so on. Additionally, the network may include copper-based data communications devices and cabling, fiber optic devices and cabling, wireless devices, combinations thereof, etc. Furthermore, the network is capable of supporting LAN-based communications, SAN-based communications, combinations thereof, and so on.

Additionally, it should be understood that the above-described techniques are well suited for discovering a "touch the fence" attack. In particular, if a hacker attempts to authenticate by trying many users 24 and two or three authentications per user 24 to avoid locking the users 24 out, the authentication server 28 will detect the attack by sensing the increase in authentication failures from the same computerized device 22.

Furthermore, such discovery may involve exposing device and IP velocity predictors to a policy engine. That is, a "device velocity" predictor can be input in combination with an "ip auth" predictor where the "ip auth" predictor is used to track a computerized device 22 that fails a challenge. If the number of users 24 coming from a single computerized device 22 (device velocity predictor) failing challenge (ip auth predictor) increases, this sensed activity is most likely an attacker attempting to guess user credentials.

Additionally, the device, IP and other velocities can be input to the policy engine for automatic application of policies and policy setting, i.e., a policy management system. Accordingly, it is not necessary for a human administrator to add more fields into the policy management system. Rather, the same device or IP lockout policies as in a risk based user lockout technique can be used, but lockout computerized devices 22 instead of locking out users 24. Furthermore, an IP address (e.g., a computerized device 22, network equipment, etc.) with many users with a high authentication fail rate can be recommended to go on to a list which is distributed to a fraud mitigation network. Also, even a mobile device with many users, trying to access new apps from a new location, can be locked.

Furthermore, the velocity metrics 60 can be used as input to set an overall sensitivity index for the system. That is, there may be an attacker that uses new IP addresses and/or new computerized devices 22 in each failed authentication attempt. Nevertheless, the above-described techniques understand that if there are more failed authentication attempts coming from many new computerized devices and new IP addresses that the system has never seen before (i.e., that are unfamiliar and not previously associated with a particular organization receiving authentication services from the authentication server 28), the overall sensitivity index can be used for lockout in order to safeguard the protected resources 44. Specifically, the authentication server 28 can detect and lockout devices 22 and IP addresses without the need to go through a more comprehensive process. Additionally, such detection and locking out can be performed quickly as well as be reset with ease. It may even detect an attack before any user accounts or other protected resources 44 are actually compromised. Such modifications and enhancements are intended to belong to various embodiments of the disclosure.

What is claimed is:

1. A method of performing authentication, the method comprising:

performing, by processing circuitry, a set of authentication operations in response to a set of authentication requests, and updating a set of velocity metrics which identifies authentication performance for a set of authentication request source devices that originated the set of authentication requests, the set of velocity metrics including a particular failed authentication velocity identifying a rate at which a particular authentication request source device provided authentication requests resulting in failed authentication;

after updating the set of velocity metrics, receiving, by the processing circuitry, an authentication request from the particular authentication request source device; and providing, by the processing circuitry, an authentication result in response to the authentication request from the particular authentication request source device, the authentication result (i) being based on the rate identified by the particular failed authentication velocity of the set of velocity metrics and (ii) indicating whether the authentication request is considered to be legitimate;

wherein performing the set of authentication operations and updating the set of velocity metrics includes:

generating a first failed authentication result in response to a first authentication attempt by the particular authentication request source device, the first authentication attempt using a first user identifier that identifies a first user, generating a second failed authentication result in response to a second authentication attempt by the particular authentication request source device, the second authentication attempt using a second user identifier that is different from the first user identifier and that identifies a second user that is different from the first user, and modifying the particular failed authentication velocity in response to the first and second failed authentication results to accurately identify occurrence of a particular number of failed authentication attempts by the particular authentication request source device during a particular amount of time; and wherein the method further comprises:

locking out the particular authentication request source device from successfully authenticating in response to the particular failed authentication velocity identifying a current failed authentication rate that exceeds a predefined threshold;

wherein the set of velocity metrics includes a set of failed authentication velocities, the set of failed authentication velocities including the particular failed authentication velocity;

wherein updating the set of velocity metrics which identifies authentication performance for the set of authentication request source devices that originated the set of authentication requests includes:

updating the set of failed authentication velocities based on failed authentication operations of the set of authentication operations;

wherein the method further comprises:

performing an authentication-related action based on the set of failed authentication velocities;

wherein the set of failed authentication velocities indicates an abnormally high failed authentication velocity for the particular authentication request source device; and wherein performing the authentication-related action based on the set of failed authentication velocities includes:

in response to detection of the abnormally high failed authentication velocity for the particular authentication request source device, (i) distributing a list of suspicious authentication request source devices to a set of server devices of a fraud mitigation network, the list of suspicious authentication request source devices identifying the particular authentication request source device, and (ii) transitioning the processing circuitry from operating in a "not locked out" state in which further authentication requests are processed to a "locked out" state in which further authentication requests are denied.

2. A method as in claim 1 wherein updating the set of failed authentication velocities based on the failed authentication operations of the set of authentication operations includes:

updating, for each source device of the set of the authentication request source devices, a respective failed authentication velocity, riskiness of that source device increasing as the respective failed authentication velocity for that source device increases.

3. A method as in claim 1 wherein updating the set of failed authentication velocities based on the failed authentication operations of the set of authentication operations includes:

deriving, for each source device of the set of the authentication request source devices, a respective rate of change in respective failed authentication velocity, riskiness of that source device increasing as the respective rate of change in respective failed authentication velocity for that source device increases.

4. A method of performing authentication, the method comprising:

performing, by processing circuitry, a set of authentication operations in response to a set of authentication requests, and updating a set of velocity metrics which identifies authentication performance for a set of authentication request source devices that originated the set of authentication requests, the set of velocity metrics including a particular failed authentication velocity identifying a rate at which a particular authentication request source device provided authentication requests resulting in failed authentication;

after updating the set of velocity metrics, receiving, by the processing circuitry, an authentication request from the particular authentication request source device; and providing, by the processing circuitry, an authentication result in response to the authentication request from the particular authentication request source device, the authentication result (i) being based on the rate identified by the particular failed authentication velocity of the set of velocity metrics and (ii) indicating whether the authentication request is considered to be legitimate;

wherein performing the set of authentication operations and updating the set of velocity metrics includes:

generating a first failed authentication result in response to a first authentication attempt by the particular authentication request source device, the first authentication attempt using a first user identifier that identifies a first user, generating a second failed authentication result in response to a second authentication attempt by the particular authentication request source device, the second authentication attempt using a second user identifier that is different from the first user identifier and that identifies a second user that is different from the first user, and modifying the particular failed authentication velocity in response to the first and second failed authentication results to accurately identify occurrence of a particular number of failed authentication attempts by the particular authentication request source device during a particular amount of time; and wherein the method further comprises:

locking out the particular authentication request source device from successfully authenticating in response to the particular failed authentication velocity identifying a current failed authentication rate that exceeds a predefined threshold;

wherein the set of velocity metrics includes a set of failed authentication velocities, the set of failed authentication velocities including the particular failed authentication velocity;

wherein updating the set of velocity metrics which identifies authentication performance for the set of authentication request source devices that originated the set of authentication requests includes:
  updating the set of failed authentication velocities based on failed authentication operations of the set of authentication operations;

wherein the method further comprises:
  performing an authentication-related action based on the set of failed authentication velocities;

wherein the processing circuitry resides in an authentication server;

wherein the method further comprises:
  maintaining, as an overall server sensitivity index, a measure of riskiness indicating whether the authentication server is currently under attack from an attacker, the measure of riskiness being based on the set of velocity metrics that is updated by the processing circuitry; and wherein performing the authentication-related action includes:
  comparing the overall server sensitivity index to a predefined threshold;
  maintaining the authentication server in a "not locked out" state in which the authentication server performs further authentication operations in response to further authentication requests while the overall server sensitivity index is below the predefined threshold; and
  operating the authentication server in a "locked out" state in which the authentication server denies further authentication requests while the overall server sensitivity index is above the predefined threshold.

5. A method as in claim 1 wherein the particular failed authentication velocity is a numerical count of the number of failed authentication attempts for all users of the particular authentication request source device during the particular amount of time;
  wherein modifying the particular failed authentication velocity in response to the first and second failed authentication results includes:
    incrementing the numerical count in response to the first failed authentication result, and subsequently incrementing the numerical count in response to the second failed authentication result; and
  wherein locking out the particular authentication request source device includes:
    preventing successful authentication attempts from the particular authentication request source device in response to modifying the failed authentication velocity and while continuing to allow successful authentication attempts from another authentication request source device.

6. A method of performing authentication, the method comprising:
  performing, by processing circuitry, a set of authentication operations in response to a set of authentication requests, and updating a set of velocity metrics which identifies authentication performance for a set of authentication request source devices that originated the set of authentication requests, the set of velocity metrics including a particular failed authentication velocity identifying a rate at which a particular authentication request source device provided authentication requests resulting in failed authentication;
  after updating the set of velocity metrics, receiving, by the processing circuitry, an authentication request from the particular authentication request source device; and
  providing, by the processing circuitry, an authentication result in response to the authentication request from the particular authentication request source device, the authentication result (i) being based on the rate identified by the particular failed authentication velocity of the set of velocity metrics and (ii) indicating whether the authentication request is considered to be legitimate;

wherein performing the set of authentication operations and updating the set of velocity metrics includes:
  generating a first failed authentication result in response to a first authentication attempt by the particular authentication request source device, the first authentication attempt using a first user identifier that identifies a first user,
  generating a second failed authentication result in response to a second authentication attempt by the particular authentication request source device, the second authentication attempt using a second user identifier that is different from the first user identifier and that identifies a second user that is different from the first user, and
  modifying the particular failed authentication velocity in response to the first and second failed authentication results to accurately identify occurrence of a particular number of failed authentication attempts by the particular authentication request source device during a particular amount of time; and wherein the method further comprises:
  locking out the particular authentication request source device from successfully authenticating in response to the particular failed authentication velocity identifying a current failed authentication rate that exceeds a predefined threshold;

wherein the set of velocity metrics includes a set of failed authentication velocities, the set of failed authentication velocities including the particular failed authentication velocity;

wherein updating the set of velocity metrics which identifies authentication performance for the set of authentication request source devices that originated the set of authentication requests includes:
  updating the set of failed authentication velocities based on failed authentication operations of the set of authentication operations;

wherein the method further comprises:
  performing an authentication-related action based on the set of failed authentication velocities; and wherein the set of failed authentication velocities indicates an abnormally high failed authentication velocity for a particular authentication request source device; and wherein performing the authentication-related action based on the set of failed authentication velocities includes:
  distributing a list of suspicious authentication request source devices to a set of server devices of a fraud mitigation network, the list of suspicious authentication request source devices identifying the particular authentication request source device.

7. A method as in claim 4 wherein the set of failed authentication velocities indicates an abnormally high failed authentication velocity for a particular authentication request source device.

8. A method as in claim 4 wherein the authentication server is currently operating in the "locked out" state; and wherein the method further comprises:

after the authentication server operates in the "locked out" state due to the overall server sensitivity index being above the predefined threshold, maintaining the authentication server in the "locked out" state until a human administrator resets the authentication server to the "not locked out" state.

9. A method as in claim 4 wherein the authentication server is currently operating in the "locked out" state; and wherein the method further comprises:

after the authentication server operates in the "locked out" state due to the overall server sensitivity index being above the predefined threshold, maintaining the authentication server in the "locked out" state for a predefined period of time and automatically transitioning the authentication server from the "locked out" state back to the "not locked out" state after expiration of the predefined period of time.

10. An electronic apparatus, comprising:

a communications interface;

memory; and control circuitry coupled to the communications interface and the memory, the memory storing instructions which, when carried out by the control circuitry, cause the control circuitry to:

perform a set of authentication operations in response to a set of authentication requests received through the communications interface, and update a set of velocity metrics which identifies authentication performance for a set of authentication request source devices that originated the set of authentication requests, the set of velocity metrics including a particular failed authentication velocity identifying a rate at which a particular authentication request source device provided authentication requests resulting in failed authentication, after updating the set of velocity metrics, receive an authentication request from the particular authentication request source device through the communications interface, and provide an authentication result in response to the authentication request from the particular authentication request source device, the authentication result (i) being based on the rate identified by the particular failed authentication velocity of the set of velocity metrics and (ii) indicating whether the authentication request is considered to be legitimate;

wherein the control circuitry, when performing the set of authentication operations and updating the set of velocity metrics, is constructed and arranged to:

generate a first failed authentication result in response to a first authentication attempt by the particular authentication request source device, the first authentication attempt using a first user identifier that identifies a first user, generate a second failed authentication result in response to a second authentication attempt by the particular authentication request source device, the second authentication attempt using a second user identifier that is different from the first user identifier and that identifies a second user that is different from the first user, and modify the particular failed authentication velocity in response to the first and second failed authentication results to accurately identify occurrence of a particular number of failed authentication attempts by the particular authentication request source device during a particular amount of time; and wherein the control circuitry is further constructed and arranged to:

lock out the particular authentication request source device from successfully authenticating in response to the particular failed authentication velocity identifying a current failed authentication rate that exceeds a predefined threshold;

wherein the set of velocity metrics includes a set of failed authentication velocities, the set of failed authentication velocities including the particular failed authentication velocity;

wherein the control circuitry, when updating the set of velocity metrics which identifies authentication performance for the set of authentication request source devices that originated the set of authentication requests, is constructed and arranged to:

update the set of failed authentication velocities based on failed authentication operations of the set of authentication operations;

wherein the control circuitry is further constructed and arranged to:

perform an authentication-related action based on the set of failed authentication velocities;

wherein the set of failed authentication velocities indicates an abnormally high failed authentication velocity for the particular authentication request source device; and wherein the control circuitry, when performing the authentication-related action based on the set of failed authentication velocities, is constructed and arranged to:

in response to detection of the abnormally high failed authentication velocity for the particular authentication request source device, (i) distribute a list of suspicious authentication request source devices to a set of server devices of a fraud mitigation network, the list of suspicious authentication request source devices identifying the particular authentication request source device, and (ii) transition the control circuitry from operating in a "not locked out" state in which further authentication requests are processed to a "locked out" state in which further authentication requests are denied.

11. An electronic apparatus as in claim 10 wherein the control circuitry, when updating the set of failed authentication velocities based on the failed authentication operations of the set of authentication operations, is constructed and arranged to:

update, for each source device of the set of the authentication request source devices, a respective failed authentication velocity indicating a numerical measure of failed authentication attempts by that source device, riskiness of that source device increasing as the respective failed authentication velocity for that source device increases.

12. An electronic apparatus as in claim 10 wherein the control circuitry, when updating the set of failed authentication velocities based on the failed authentication operations of the set of authentication operations, is constructed and arranged to:

derive, for each source device of the set of the authentication request source devices, a respective rate of change in respective failed authentication velocity indicating a numerical rate of failed authentication attempts by that source device, riskiness of that source device increasing as the respective rate of change in respective failed authentication velocity for that source device increases.

13. A computer program product having a non-transitory computer readable medium which stores a set of instructions to perform authentication, the set of instructions, when carried out by computerized circuitry, causing the computerized circuitry to perform a method of:

performing a set of authentication operations in response to a set of authentication requests, and updating a set of velocity metrics which identifies authentication performance for a set of authentication request source devices that originated the set of authentication requests, the set of velocity metrics including a particular failed authentication velocity identifying a rate at which a particular authentication request source device provided authentication requests resulting in failed authentication;

after updating the set of velocity metrics, receiving an authentication request from the particular authentication request source device; and providing an authentication result in response to the authentication request from the particular authentication request source device, the authentication result (i) being based on the rate identified by the particular failed authentication velocity of the set of velocity metrics and (ii) indicating whether the authentication request is considered to be legitimate;

wherein performing the set of authentication operations and updating the set of velocity metrics includes:

generating a first failed authentication result in response to a first authentication attempt by the particular authentication request source device, the first authentication attempt using a first user identifier that identifies a first user, generating a second failed authentication result in response to a second authentication attempt by the particular authentication request source device, the second authentication attempt using a second user identifier that is different from the first user identifier and that identifies a second user that is different from the first user, and modifying the particular failed authentication velocity in response to the first and second failed authentication results to accurately identify occurrence of a particular number of failed authentication attempts by the particular authentication request source device during a particular amount of time; and wherein the method further comprises:

locking out the particular authentication request source device from successfully authenticating in response to the particular failed authentication velocity identifying a current failed authentication rate that exceeds a predefined threshold;

wherein the set of velocity metrics includes a set of failed authentication velocities, the set of failed authentication velocities including the particular failed authentication velocity;

wherein updating the set of velocity metrics which identifies authentication performance for the set of authentication request source devices that originated the set of authentication requests includes:

updating the set of failed authentication velocities based on failed authentication operations of the set of authentication operations;

wherein the method further comprises:

performing an authentication-related action based on the set of failed authentication velocities;

wherein the set of failed authentication velocities indicates an abnormally high failed authentication velocity for the particular authentication request source device; and wherein performing the authentication-related action based on the set of failed authentication velocities includes:

in response to detection of the abnormally high failed authentication velocity for the particular authentication request source device, (i) distributing a list of suspicious authentication request source devices to a set of server devices of a fraud mitigation network, the list of suspicious authentication request source devices identifying the particular authentication request source device, and (ii) transitioning the computerized circuitry from operating in a "not locked out" state in which further authentication requests are processed to a "locked out" state in which further authentication requests are denied.

14. A computer program product as in claim 13 wherein updating the set of failed authentication velocities based on the failed authentication operations of the set of authentication operations includes:

updating, for each source device of the set of the authentication request source devices, a respective failed authentication velocity indicating a numerical measure of failed authentication attempts by that source device, riskiness of that source device increasing as the respective failed authentication velocity for that source device increases.

15. A computer program product as in claim 13 wherein updating the set of failed authentication velocities based on the failed authentication operations of the set of authentication operations includes:

deriving, for each source device of the set of the authentication request source devices, a respective rate of change in respective failed authentication velocity indicating a numerical rate of failed authentication attempts by that source device, riskiness of that source device increasing as the respective rate of change in respective failed authentication velocity for that source device increases.

* * * * *